T. PANZERBIETER ET AL

Aug. 2, 1932. TRANSMISSION SYSTEM SWITCH Re. 18,553

Original Filed May 8, 1925

INVENTORS.
*Theodor Panzerbieter &*
*Wilhelm Nagel.*
BY
*Chester H. Boan*
ATTORNEY Reissued Aug. 2, 1932

Re. 18,553

UNITED STATES PATENT OFFICE

THEODOR PANZERBIETER, OF BERLIN-CHARLOTTENBURG, AND WILHELM NAGEL, OF BERLIN, GERMANY, ASSIGNORS TO WESTINGHOUSE ELECTRIC & MANUFACTURING COMPANY, OF NEW YORK, N. Y., A CORPORATION

TRANSMISSION SYSTEM SWITCH

Original No. 1,718,251, dated June 25, 1929, Serial No. 28,816, filed May 8, 1925, and in Germany April 7, 1924. Application for reissue filed September 11, 1929. Serial No. 391,964.

Our invention relates to improvements in transmission-system switches of that type in which the switch blades are supported by an insulator rotatably arranged between the two stationary supporting insulators carrying the lines.

It is well known that such transmission-line switches become clogged by ice in winter so that the closing and the opening of the switch then becomes difficult, if not altogether impossible.

Our invention consists of an improved arrangement and construction of such switches in which the blade is loosened in the contacts prior to the switch being opened so that the opening of the switch is greatly facilitated. According to our invention, the switch blade is made movable in relation to the rotatable insulator.

In the drawing affixed to our specification and forming part thereof:

In the constructions illustrated in the figures the bridging member comprises two blades each of which is eccentrically fulcrumed upon the rotary insulator $i_3$. At the commencement of the opening motion of the switch the fulcrum $z_1$, for instance, in Fig. 1 moves in a circle and causes angular movement of the blade $m_1$ and thereby cracks the ice. When the blade $m_1$ has reached the position indicated in broken lines, its end comes in contact with the stop $a_1$ and subsequently the blade is forced out of the stationary contact $k_1$. A similar process takes place with the blade $m_2$ at the stationary contact $k_2$.

In the arrangement illustrated in Fig. 4 the fulcrum pins $z_1$ and $z_2$ are located sideways from the connecting line of the two stationary contacts $k_1$ and $k_2$. On turning the rotary insulator $i_3$ clockwise for the purpose of opening the switch the blades $m_1$ and $m_2$ are loosened in their stationary contacts $K_1$ and $K_2$ by a movement in the direction of their longitudinal axis and only after this has happened do the stops $a_1$ and $a_2$ come in contact with and carry the blades $m_1$ and $m_2$ along in an arc around the axis of rotation of the insulator $i_3$ to completely open the circuit.

Figure 1:
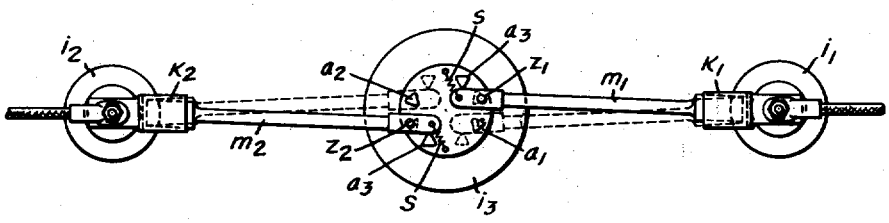
Figures 1 and 2 are plan views of a switch embodying our invention.
Figure 2:
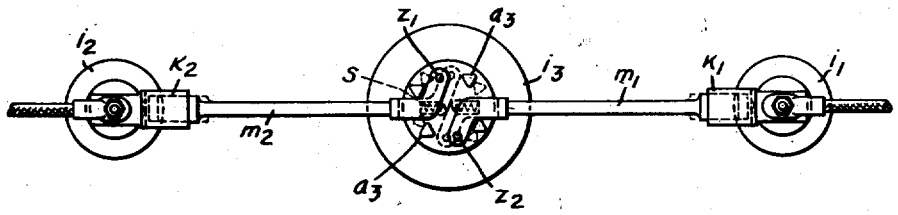
Figure 3:
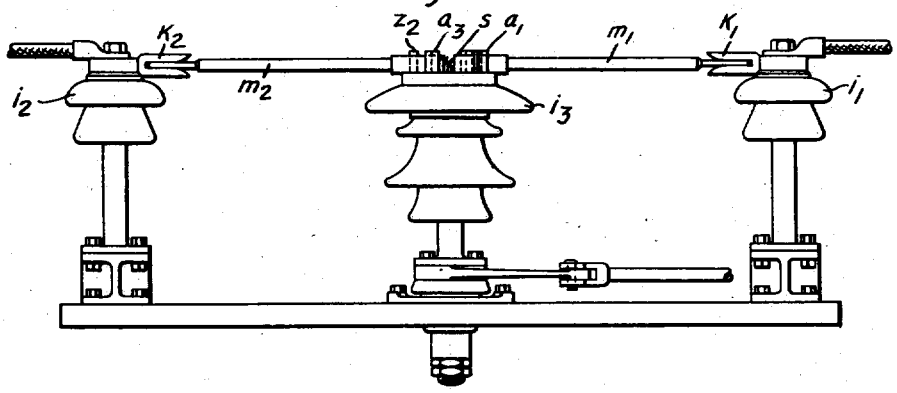
Fig. 3 is a view in elevation of the switch structure of Figs. 1 and 2.

In the arrangement of both Figs. 1 and 2, to secure the position of the switch blade in the opened state upon the rotary insulator $i_3$, a spring S is arranged upon the latter which forces the switch blade against a stop upon the insulator by means of which stop the blade is forced into the stationary contacts $K_1$ and $K_2$ when the switch is closed again. These stops are shown in the figures indicated by the reference letter $a_3$.

Accordingly, throughout the movement to closed position, the switch blades occupy the positions relative to each other which are indicated by the full lines in Figs. 1 and 2, thus acting in closing like ordinary rigid switch blades of the prior art. The movements to the positions indicated by dotted lines are merely effected to break ice-seals when it is desired to open the switch.

It will be understood that the details of construction may be modified within the ambit of the claims without departing from the spirit of our invention.

We claim as our invention:

1. In a switch, a rotary insulator and stationary insulators spaced from said rotary insulator, contacts on said stationary insulators, bridging means comprising blade members each eccentrically pivoted upon said rotary insulator, stop means upon said rotary insulator adapted to force the blade members into engagement with said contacts when closing said switch, and spring means adapted to force said blade members against said stop means when said switch is open.

2. In a switch for transmission lines of the type in which the contact bridging member is mounted on a rotary insulator located between the two stationary insulators supporting the lines, a bridging member divided into two sections, each of said sections being eccentrically mounted upon said rotary insulator.

3. In a switch structure, the combination with an axially rotatable insulator located between two stationary insulators provided with contact members, of a pair of switch blades for engaging said contact members pivoted eccentrically upon said rotatable insulator.

4. In a switch structure, the combination with an axially rotatable insulator located between two stationary insulators provided with contact members, of a pair of switch blades for engaging said contact members pivoted eccentrically upon said rotatable insulator so that said blades move substantially longitudinally in relation to the said rotatable insulator when initially rotated to open position and thereafter to revolve with the insulator.

5. In a switch structure, the combination with an axially rotatable insulator located between two stationary insulators provided with contact members, of a pair of switch blades for engaging said contact members pivoted eccentrically upon said rotatable insulator, stops upon said rotatable insulators adapted to force said blades into said contact members during the closing operation and means adapted to force said blades against said stops after said blades have separated from said contact members.

6. In a switch structure, the combination with an axially rotatable insulator located between two stationary insulators provided with contact members, of a pair of switch blades positioned substantially in line with each other on said rotatable insulator, and means for shortening the over-all length of said pair of blades and for rotating said blades upon the rotation of said insulator.

THEODOR PANZERBIETER.
WILHELM NAGEL.